United States Patent [19]

Faust et al.

[11] Patent Number: 5,877,436
[45] Date of Patent: Mar. 2, 1999

[54] METHOD FOR QUANTITATIVE DETERMINATION OF THE PRESSURE COMFORT OF A SEAT CUSHION

[75] Inventors: Eberhard Faust; Karl Pfahler; Helge Schmidt, all of Stuttgart, Germany

[73] Assignee: Mercedes-Benz AG, Stuttgart, Germany

[21] Appl. No.: 786,446

[22] Filed: Jan. 21, 1997

[30] Foreign Application Priority Data

Jan. 20, 1996 [DE] Germany .................. 196 01 974.5

[51] Int. Cl.$^6$ .................. G01D 7/00; G01N 17/00; G01B 7/16
[52] U.S. Cl. .................. 73/865.6; 73/862.043; 73/767; 73/768; 364/558
[58] Field of Search .................. 73/865.6, 862.041, 73/862.381, 862.042, 862.043, 767, 768; 364/558

[56] References Cited

U.S. PATENT DOCUMENTS

| | | | |
|---|---|---|---|
| 5,060,174 | 10/1991 | Gross | 364/558 |
| 5,088,503 | 2/1992 | Seitz . | |
| 5,170,364 | 12/1992 | Gross et al. . | |
| 5,176,424 | 1/1993 | Tobita et al. | 297/284.1 |
| 5,617,595 | 4/1997 | Landi et al. | 297/425.41 |

OTHER PUBLICATIONS

*SAE 1993 Transactions Journal of Passenger Car*, Section 6, vol. 102, entitled "Automotive Seating Analysis Using Thin, Flexible Tactile Sensor Arrays" by Robert M. Podoloff, pp. 187–193.

*Primary Examiner*—George M. Dombroske
*Assistant Examiner*—Max H. Noori
*Attorney, Agent, or Firm*—Evenson, McKeown, Edwards & Lenahan, P.L.L.C.

[57] ABSTRACT

A method is provided for quantitative determination of the pressure comfort of a seat cushion. For this purpose, the sitting surface of the seat cushion to be tested is loaded mechanically in a manner that corresponds to a normal individual sitting in it, and the seat distribution is then determined with an interposed measuring mat. The signals from the individual pressure sensors of the measuring mat are summarized in accordance with anthropomorphically determined loading ranges with different pressure sensitivity thresholds groupwise and evaluated separately for the individual areas. For this purpose, the pressure measurement signals are multiplied by a factor or a pressure-dependent progressively increasing evaluation function and the product function is integrated. The pressure sensitivity threshold is assigned a value of 1. Depending on the difference between the respective pressure measurement value and the pressure sensitivity threshold ($p_0$) the quality factor increases approximately parabolically or in geometric stages with increasing difference. The sum of the integral values obtained for the product functions is output as a rating number for the pressure comfort of the cushion. The comfort investigation can be performed with subjects of different sizes or seat testing punches of different sizes (5%, 50%, and 95% percentile), with an average or total value for all the results being used as a rating number for pressure comfort.

13 Claims, 3 Drawing Sheets

METHOD FOR QUANTITATIVE DETERMINATION OF THE PRESSURE COMFORT OF A SEAT CUSHION

BACKGROUND AND SUMMARY OF THE INVENTION

The invention relates to a method for determining the pressure comfort of seat cushions.

In the development of seats, especially vehicle seats, a question of good pressure comfort arises because the occupants, and especially the driver, sometimes have to remain seated on vehicle seats for many hours with only limited movement. In this regard, questions of optimum seat pressure distribution play a role. The behavior of a seat in this regard is determined by a number of factors, for example the design, structure, and finishing of the multi-layer combination of the covering material and the material, type, and structure of the seat foundation and the like. If the sitting pressure of a seat cushion is unfavorable when an individual sits on it, it will be perceived as unpleasant and uncomfortable for prolonged sitting.

In the course of seat development, various seat and cushion designs are prepared as trial samples and these must be compared with one another in an objective and reproducible fashion regarding various testing and evaluation criteria, especially as regards pressure comfort, in order to be able to pick the best trial sample in this way. Not only new trial samples from actual seat development but also various test seats from other sources, for example seats of earlier seat generations, used seats, or seats from outside development or manufacturing facilities, are compared with one another.

In the past, comfort-relevant seat testing could only be performed by test subjects. This of course produces only subjective test results that depend on how the individual tested was feeling that day, in other words results that are inaccurate and nonreproducible. Such tests are also costly in terms of time and personnel because the test must be performed in the vehicle and by several test subjects in order to yield results that show less scatter. The installation of a seat to be tested in a vehicle is also time-consuming, especially when comparison-testing objects from outside manufacturers.

The goal of the invention is to provide a method that offers a quantitative, realistic, and reproducible statement about the pressure comfort of test seats when testing seats for pressure comfort.

This goal is achieved according to the invention by a method for determining the pressure comfort of a seat cushion. According to this method, during realistic mechanical loading of the seat with the seat cushion to be tested, the sitting pressure distribution on the surface of the seat is measured with a suitable known measuring mat and the signals from the individual pressure sensors in the measuring mat are evaluated. For this purpose, the measurement signals from suitably anthropomorphically determined loading areas with different pressure sensitivity thresholds are combined in groups and evaluated separately for the individual areas. In each area, the pressure measurement values are evaluated in accordance with the magnitude of the determined pressure, i.e. multiplied by a factor. The greater the pressure in a certain sensor field differs from the pressure sensitivity threshold, the higher this measured value is rated and the higher the corresponding quality factor, with a pressure-dependent progressively increasing quality factor being used in this case. The pressure sensitivity threshold $(p_0)$ of the respective area is assigned a value of 1 as a quality factor. Depending on the difference between the individual measured pressure value and the pressure sensitivity threshold, the quality factor increases progressively with an increasing difference. By means of the multiplicative evaluation of the pressure distribution function, a product function is obtained for each area of the seat and is then integrated. The sum of the integral values of the product functions obtained is output as the rating number for the pressure comfort of the cushion.

The sitting surface of the seat cushion to be tested can be stressed by a seated test subject or, preferably, by means of an anthropomorphically designed seat testing punch. The comfort test can be conducted with persons of different sizes or with seat testing punches of different sizes (5%, 50%, and 95% percentiles), and an average or sum of all the results can be used as a rating number for pressure comfort.

In conjunction with optimum sitting pressure distribution, it can be said in general that body weight when sitting should optimally be supported by the buttocks and therefore primarily by the two so-called ischial humps. The sitting pressure distribution should therefore have pronounced maxima in the vicinity of the two ischial humps, said maxima making a gentle transition to a lower pressure level in the surrounding area, while in the vicinity of the thighs the sitting pressure should be as flat as possible and taper to zero at the edge of the cushion that faces the backs of the knees.

The measurement principle is based on human perception of the sitting pressure. The receptors in humans that feel contact pressure are distributed over the entire body surface. The sensitivity of the receptors differs in various skin areas, however. Sensitivity to pressure depends on the following: (1) the respective sensitivity of the skin area to which the pressure is being applied; (2) the size of the area exposed to the pressure, in other words the number of receptors that are impacted above the pressure sensitivity threshold; (3) the magnitude of the stimulus; (4) the fact that subjective pressure sensitivity increases exponentially with increasing application of pressure; and (5) the duration of the stimulating effect.

Practical experience with the measurement method according to the invention and a comparison of the measured pressure comfort numbers for various seats with subjective statements from test subjects who tested the seats confirm that the measurement method offers quantitatively reproducible and especially representative information about the pressure comfort of seats.

The following advantages can be achieved by the invention:

(1) the tests proceed under exactly defined measurement conditions;

(2) the anatomy and anthropomorphy of human beings as well as the subjective sensitivity of the test subjects are the basis of the measurement method and signal evaluation;

(3) measurement results are obtained that are reproducible and representative of pressure comfort, in other words they are objective;

(4) series measurements with anthropomorphically designed seat testing punches are quite possible, especially if the optimum quality number range has first been determined by statistical tests on human subjects;

(5) the measurement results from different seats, new developments from one's own development program, or seats from other manufacturers can be assigned to a uniform measurement scale and compared with one another as a result without difficulty;

(6) differences and special features of pressure distribution that cannot be detected by simply looking at a pressure distribution diagram are clearly shown by the measurable pressure comfort number and therefore can be followed systematically for the first time;

(7) as a result of the invention, seat development can proceed more clearly for optimum seat pressure comfort and can be considerably speeded up;

(8) since the measurement method proceeds in all phases under defined conditions and leads to a reproducible, representative, and numerical measurement result, the measurement method can be standardized, which would considerably facilitate contact between seat suppliers and automobile developers.

Other objects, advantages and novel features of the present invention will become apparent from the following detailed description of the invention when considered in conjunction with the accompanying drawings.

DETAILED DESCRIPTION OF THE DRAWINGS

Figure 1:
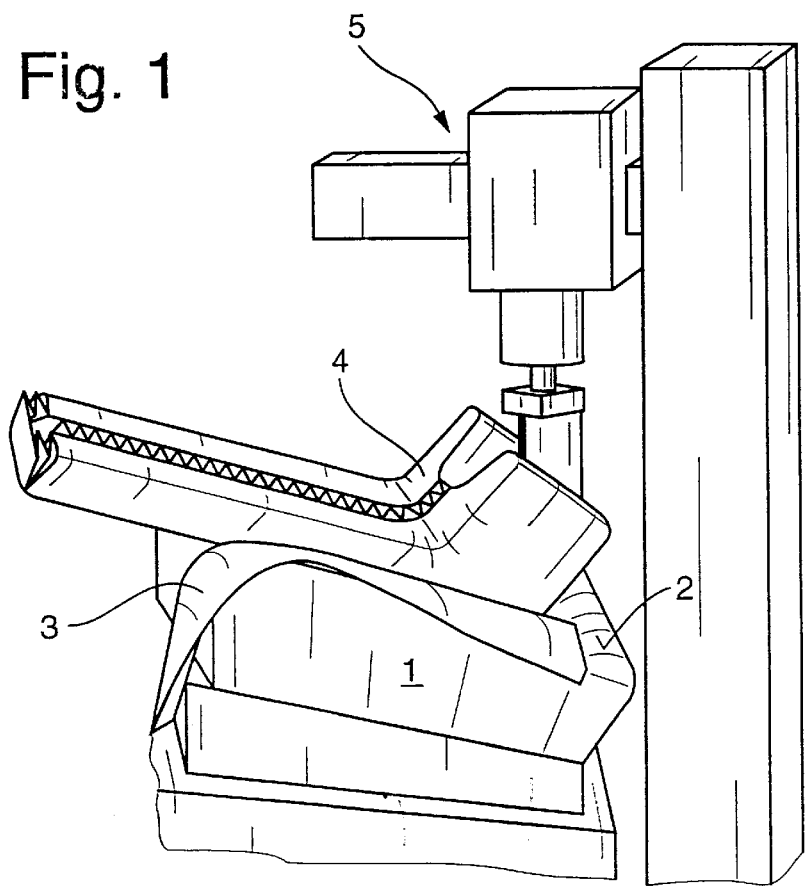
FIG. 1 shows a measuring system with a seat cushion to be tested in a testing machine using a seat test punch.

The embodiment of a measuring device shown in FIG. 1 has a testing machine 5 into which seat cushion 1 to be tested is placed in a specific position. A measuring mat 3 is placed on seat surface 2 of the cushion. The seat cushion is loaded by a seat testing punch 4 by which the sitting of a person on the seat cushion can be realistically simulated. In terms of its rigid parts, the seat testing punch 4 simulates the areas of the pelvis and thigh bones which are of interest here, including the hip joints, of a human skeleton. By upholstering this pressure element, the punch 4 anthropomorphically simulates the soft parts in the area of the buttocks, namely the muscle, connective, and fatty tissue in terms of their local distribution of thickness and softness. In particular, the area of the two ischial humps of human buttocks and their immediate vicinity are simulated as naturally as possible in terms of shape, position, hardness, and local hardness distribution by seat testing punch 4.

With a seat testing punch of this kind, which is the subject of co-pending U.S. Ser. No. 08/786,444 entitled "SEAT TESTING PUNCH" filed on even date herewith and commonly assigned to the assignee of the present invention, the specification of which is expressly incorporated by reference herein, the seat cushion 1 can be loaded in a realistic fashion in terms of total pressure force and seat pressure distribution as when a person sits down. The use of such a seat testing punch is not a basic requirement for the measuring method according to the invention as such, but it creates important conditions for reproducible determination of the sitting pressure distribution of the seat cushion.

Figure 3:
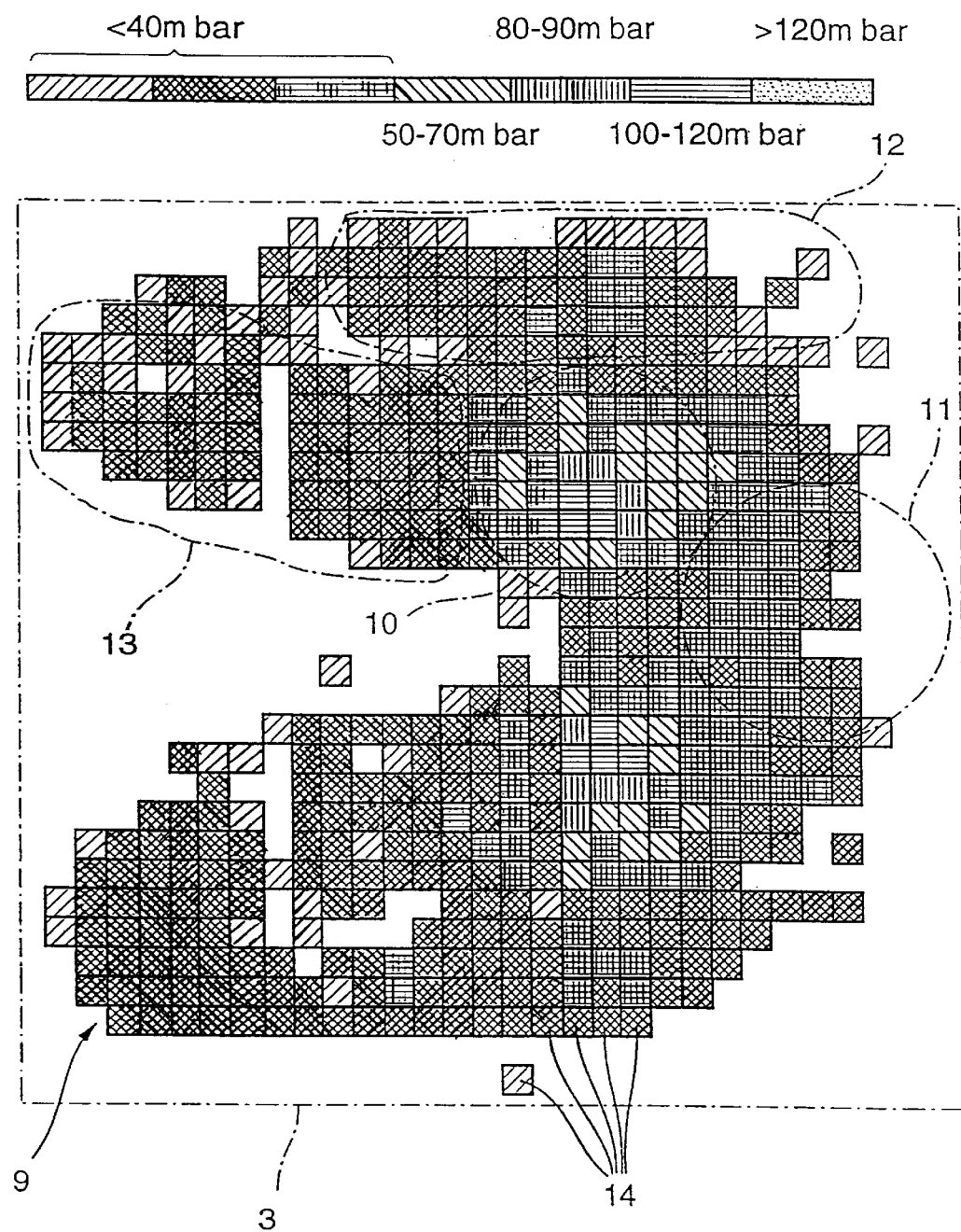
FIG. 3 shows another seat pressure distribution as a value grid that can be obtained directly from the measuring mat.

To determine the sitting pressure distribution of seat cushion 1, a measuring system like that shown in FIG. 1 can be used. A seat cushion 1 is held in testing machine 4 in a specified position and a known, flexible, thin measuring mat 3 is placed on it, said mat having a plurality of closely adjacent pressure measuring cells distributed according to a preferably orthogonal grid, and contains a corresponding number of electrical leads that extend outward. Each pressure measuring cell occupies a certain measuring field 14 (FIG. 3), with all of the pressure measuring cells jointly covering completely the surface of the seat to be tested. Seat testing punch 4, when used for measurement, is pressed into seat cushion 1 by a testing force that acts vertically and has a magnitude that can be precisely controlled, so that the weight of a person to be simulated can be precisely adjusted. It is important to have a uniform loading of the two ischial humps or halves of the seat. For this reason the testing force must be conducted symmetrically, in other words centrally into the simulated pelvis of the seat testing punch and the seat testing punch must likewise be placed symmetrically on seat cushion 1 to be tested.

Figure 2:
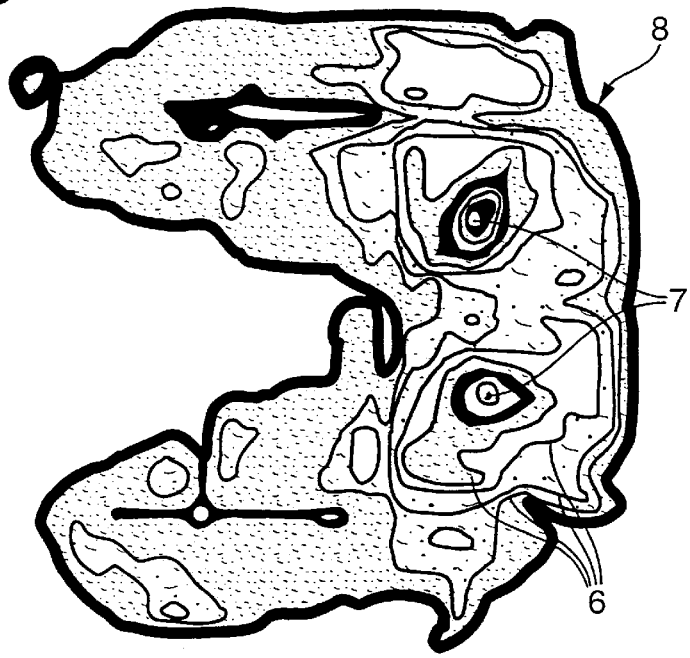
FIG. 2 shows a seat pressure distribution as a family of isobars that can be determined with a measuring system according to FIG. 1.

By correct loading of the seat cushion and pressure measuring mat 3 placed on it by means of the seat testing punch operated by testing machine 5, with suitable signal processing, the pressure distribution in loaded seat surface 2 can be output directly on a monitor or another output unit or can be displayed or even further processed by computer. The display for example can be in the form of a family of isobars 6 in a diagram according to FIG. 2. In the diagram, one can clearly see the two pressure peaks 7 in the vicinity of the ischial humps that receive the main pressure. The pressure should decrease around these pressure peaks in a comfortable seat cushion and be flat in the vicinity of the thighs.

In the quantitative determination of the pressure comfort of a seat cushion the procedure according to the invention is as follows: during realistically simulated loading of seat 2 of seat cushion 1 to be tested, the sitting pressure distribution on the surface of the seat is determined with measuring mat 3 placed in between. The measuring mat used for the purpose has a plurality of pressure sensors arranged according to a surface-covering pattern, with each having measuring signal leads extending outward separately. The signals from the individual pressure sensors of the measuring mat are combined groupwise in accordance with anthropomorphically determined areas with different pressure sensitivity thresholds and are evaluated separately for each area. In this process, seat cushion surface 2 (see the drawing in FIG. 3) is divided into the following areas with corresponding pressure sensitivity thresholds ($p_0$) given in mbar:

(a) two symmetrically located ischial hump areas 10 with $P_o$=60;

(b) a centrally located coccyx area 11 with $p_0$=50;

(c) two symmetrically located cheek areas 12 with $p_0$=40; and (d) two symmetrically located thigh areas 13 with $p_0$=40.

For measurements on the backrest cushion surface, the latter is divided in similar fashion into the following areas with corresponding pressure sensitivity thresholds ($p_0$) in mbar:

(a) a centrally located pelvic area with $p_0$=30;

(b) a centrally located lordotic area with $p_0$=30;

(c) two symmetrically located lateral bead areas with $p_0$=40; and (d) two symmetrically located shoulder areas with $p_0$=30.

In the areas that are provided pairwise and symmetrically, only the area with the higher load is evaluated in each case. Within each individual area to be evaluated, the measured pressure values determined by the pressure sensors in the measuring mat are evaluated with a quality factor, i.e. multiplied. The respective pressure sensitivity threshold ($p_0$) of each area is assigned a value of 1. Higher pressure measurement values receive a higher quality factor as the difference increases, with the value of the quality factor rising progressively as a function of the difference between the respective measured pressure value and the pressure sensitivity threshold ($p_0$). As a result of the multiplication of each pressure measurement value by a corresponding quality factor, a product function is formed that is integrated for each area to be evaluated. The integral values of all the areas are added up. This sum of the integral values obtained in the various areas from the respective product functions is output as a rating number for the pressure comfort of seat cushion 1 or the backrest cushion of the seat.

The quality factor that increases progressively as a function of the difference between the respective pressure measurement value and the pressure sensitivity threshold $p_0$ with an increase in the difference can rise in accordance with various laws. An exponential or logarithmic rise comes closest to the biological sensitivity laws. This rise is approximated by a parabolic increase that is easier to study with a computer. Such a rise in turn can be approached in stages by a geometric series, which considerably simplifies evaluation but influences the measurement result only insignificantly in terms of what it shows. For such a step formation, pressure measurement values of the lowermost stage that correspond to the pressure sensitivity threshold po with an approximation of approximately ±10 to 15% are assigned a quality factor of 1.0 ($=k^0$).

In a next-higher-stage pressure measurement, values that correspond to a higher comparison value in contrast to pressure sensitivity threshold $p_0$ by one times a certain differential amount $\Delta p$, 10 mbar for example, with an approximation of approximately ±10 to 15%, in an area-constant fashion are assigned a quality factor $k^1$ with $k>1.7$, preferably $k=2$.

In the third stage, pressure measurement values that correspond to a comparison value that is higher by comparison with pressure sensitivity threshold ($p_0$) by twice the differential amount ($\Delta p$) with an approximation of approximately ±10 to 15%, are assigned, in an area-constant manner, the quality factor $k^3$.

Pressure measurement values that correspond to a higher comparison value with respect to pressure sensitivity threshold ($p_0$) by n times the differential amount ($\Delta p$) with an approximation of about ±10 to 15%, are assigned, in an area-constant manner, the quality factor $k^n$, and so forth.

Figure 4:
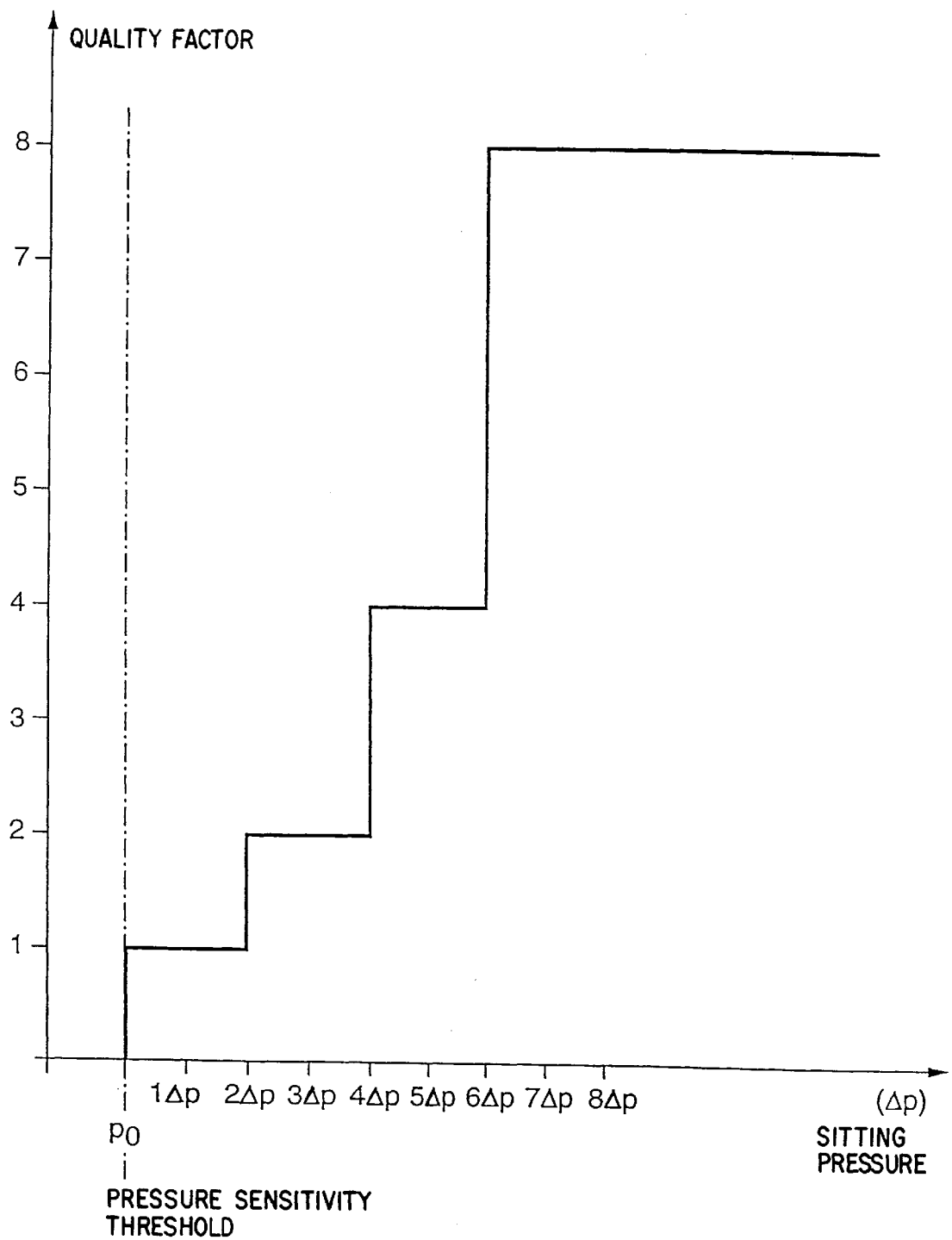
FIG. 4 is a graph showing the pressure-dependent geometrically staged increase of the quality factor.

For example, as shown in the graph in FIG. 4, the following values rising in stages in a geometric series can be assumed, where $\Delta p$ can mean a pressure differential amount, for example the response sensitivity of approximately 10 mbar of the pressure measuring sensors for example: in the pressure range $p_0$ to $2\Delta p$ the quality factor is 1; in the pressure range $p_0+3\Delta p$ to $P_0+4\Delta p$ the quality factor is 2; in the pressure range $p_0+5\Delta p$ to $p_0+6\Delta p$ the quality factor is 4; and in the pressure range above $p_0+7\Delta p$ the quality factor is 8.

The method of pressure comfort determination is advantageously conducted several times by means of seat loading using persons of different sizes or seat test punches of different sizes. The rating numbers thus obtained for pressure comfort are averaged or added. For example, the method can be conducted three times, namely with a 5% percentile subject or a suitably dimensioned 5% percentile seat test punch, a 50% percentile subject or seat testing punch, and a 95% percentile subject or seat testing punch.

In the evaluation of seat pressure distribution within each individual area, the pressure values determined from the pressure sensors of the measuring mat can be evaluated immediately with the respectively assigned quality factor, i.e. multiplied. Then within each anthropomorphically set sitting area for each individual pressure stage, the size of the area loaded at this pressure level can be determined and this area can be "evaluated" i.e. multiplied by the respective associated quality factor, with the sum of all the "evaluated" areas being output as the rating number of the pressure comfort of seat cushion (1) or the backrest cushion of the seat. This modification of the method is especially simple from the evaluation standpoint when the number of pressure sensors that fall into this pressure stage on the basis of their signals is counted to determine the area loaded within a pressure stage. Limiting the number of pressure stages to four is sufficient for determining a meaningful rating number for sitting pressure comfort.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for determining pressure comfort of a cushion, the method comprising the steps of:

mechanically loading at least one of a seat cushion or a backrest surface of a seat to be tested in accordance with a normal occupation by a seated person;

during this loading, determining the pressure distribution on a seat cushion surface or the backrest surface using a measuring mat placed in between, said measuring mat containing a plurality of pressure sensors arranged and distributed according to a pattern, each of said pressure sensors having separate measurement signal leads;

combining signals from individual ones of said pressure sensors in the measuring mat groupwise in accordance with anthropomorphically determined areas with different pressure sensitivity thresholds, and evaluating the signals from the individual pressure sensors separately for each area, with said seat cushion surface being divided into the following areas with respective pressure sensitivity thresholds ($p_0$) given in mbar:

(a) two symmetrically located thigh areas with $p_0=40$;

(b) two symmetrically located cheek areas with $p_0=40$;

(c) two symmetrically located ischial hump areas with $p_0=60$; and (d) a centrally located coccyx area with $p_0=50$;

wherein said backrest surface is divided into the following areas with corresponding pressure sensitivity thresholds ($p_0$) given in mbar:

(a) a centrally located pelvic area with $p_0=30$;

(b) a centrally located lordotic area with $p_0=30$;

(c) two symmetrically located lateral bead areas with $p_0=40$; and (d) two symmetrically located shoulder areas with $p_o=30$;

within each area, evaluating local pressure values of the pressure distribution corresponding to the difference of a local pressure from the respective pressure sensitivity threshold ($p_o$) via multiplication by a quality factor so as to form an evaluated seat pressure distribution as a product function with the respective pressure sensitivity threshold ($p_o$) being assigned a value of 1 as the quality factor and, starting with the respective pressure sensitivity threshold ($p_0$), with an increasing difference of a local sitting pressure from the pressure sensitivity threshold ($p_0$) a progressively increasing value is used as the quality factor;

integrating the pressure distributions evaluated in this manner in the individual areas, and adding up the integral values of all the areas;

outputting a sum of the adding step as a rating number for the pressure comfort of the seat cushion or the seat back cushion of the seat.

2. The method according to claim 1, wherein only a higher loaded area is evaluated in the areas which are in symmetrical pairs.

3. The method according to claim 1, wherein measured pressure values determined by the pressure sensors in the measuring mat are evaluated directly with the respective associated quality factor via multiplication in the step of evaluating the pressure distribution within each individual area.

4. The method according to claim 1, wherein for evaluating a sitting pressure distribution within the individual areas, the method further comprises the steps of:
- a total range of measured pressure values, starting with the respective pressure sensitivity threshold ($p_0$) of the anthropomorphically determined sitting range, is subdivided into arithmetically staged increasing individual areas of pressure—pressure stages—and each pressure stage is assigned a progressively increasing quality factor, with the respective pressure sensitivity threshold ($p_0$) being assigned a quality factor of 1;
- within each anthropomorphically determined sitting area for each individual pressure stage, the size of the area loaded with this pressure level is determined and this area is multiplied by the respectively assigned quality factor;
- the sum of all the multiplied areas is output as the rating number for the pressure comfort of the seat cushion or the seat back cushion of the seat.

5. The method according to claim 4, wherein in order to determine the area loaded within a pressure stage, the number of pressure sensors whose signals fall in this pressure stage is counted.

6. The method according to claim 4, wherein the pressure stages are subdivided as follows and each pressure stage is assigned a valuation factor that is given later:
- pressure measurement values that correspond to pressure sensitivity threshold ($p_0$) with an approximation of approximately ±10 to 15% are assigned a quality factor of 1.0;
- pressure measurement values that correspond to a comparison value that is higher by comparison with pressure sensitivity threshold ($p_0$) by one times a certain differential amount ($\Delta p$) with an approximation of approximately ±10 to 15% are assigned an area-constant quality factor $k^1$ with $k>1.7$;
- pressure measurement values that correspond to a comparison value that is higher by comparison with pressure sensitivity threshold ($p_0$) by twice the differential amount ($\Delta p$), with an approximation of approximately ±10 to 15%, are assigned an area-constant quality factor of $k^2$;
- pressure measurement values that correspond to a comparison value that is higher with respect to pressure sensitivity threshold ($p_0$) by n times the differential amount ($\Delta p$) with an approximation of approximately ±10 to 15% are assigned an area-constant quality factor $k^n$.

7. The method according to claim 4, wherein during the evaluation of the sitting pressure distribution within the individual areas, three to five, and preferably four, pressure stages are used.

8. The method according to claim 7, wherein in the evaluation of the sitting pressure distribution within the individual areas, the following pressure stages and corresponding quality factors assigned to each are used, with approximately 10 mbar being used as a pressure differential amount $\Delta p$:

in the pressure range $p_0$ to 2 $\Delta p$, the quality factor is 1;

in the pressure range $p_0+3$ $\Delta p$ to $p_0+4$ $\Delta p$, the quality factor is 2;

in the pressure range $p_0+5$ $\Delta p$ to $p_0+6$ $\Delta p$, the quality factor is 4; and in the pressure range above $p_0+7$ $\Delta p$, the quality factor is 8.

9. The method according to claim 1, wherein a realistic mechanical loading of the seat cushion by an anthropomorphically designed upholstered seat testing punch is simulated in a testing machine, with the seat testing punch naturally simulating via hard and soft parts an area of the buttocks and thighs of a human being.

10. The method according to claim 1, wherein a specific pressure differential amount ($\Delta p$) by which the higher comparison value differs from the pressure sensitivity threshold ($p_0$) or from the next lower comparison value is approximately 10 mbar.

11. The method according to claim 1, wherein the method of pressure comfort determination is performed several times under seat loading with differently sized subjects in each case or with seat testing punches of different sizes, and the rating numbers thus obtained for pressure comfort are averaged or added.

12. The method according to claim 6, wherein the method is conducted three times, with a 5% percentile subject or a correspondingly dimensioned 5% percentile seat testing punch, a 50% percentile subject or seat testing punch, and a 95% percentile subject or seat testing punch.

13. A method for determining a user pressure comfort of a cushion, the method comprising the steps of:
- loading the cushion in accordance with a normal use due to a user;
- determining a pressure distribution on the cushion using a measuring mat, said measuring mat containing a plurality of pressure sensors providing pressure signals arranged and distributed according to a coverage area;
- groupwise combining the pressure signals from groupings of said pressure sensors in the measuring mat according to anthropomorphically determined areas of the user having different pressure sensitivity thresholds;
- separately evaluating for each of said anthropomorphically determined areas the signals of the pressure sensors combined groupwise;
- within each of said anthropomorphically determined areas, local pressure values of the pressure distribution which correspond to a difference of a local pressure from a respective pressure sensitivity threshold ($p_o$) are evaluated via multiplication with a quality factor to form an evaluated pressure distribution as a product function, said pressure sensitivity threshold ($p_0$) being assigned an initial quality factor value which progressively increases with increasing differences between the local pressure values from the respective pressure sensitivity threshold ($p_0$);
- integrating the pressure distributions evaluated above for each of said anthropomorphically determined areas;
- adding-up the integrated values of all of said anthropomorphically determined areas; and
- using the sum of said adding step as a rating number for the pressure comfort of the cushion.

* * * * *